United States Patent [19]

Morita et al.

[11] Patent Number: 5,227,879
[45] Date of Patent: Jul. 13, 1993

[54] APPARATUS FOR TRANSMITTING AN EXTENDED DEFINITION TV SIGNAL HAVING COMPATIBILITY WITH A CONVENTIONAL TV SYSTEM

[75] Inventors: Takaya Morita; Akihiro Takahashi; Takashi Tachibana; Kazuo Kashigi; Hideo Makita, all of Tokyo, Japan

[73] Assignees: Tokyo Broadcasting System Inc.; NEC Corporation, both of Japan

[21] Appl. No.: 646,683

[22] Filed: Jan. 28, 1991

[30] Foreign Application Priority Data

Jan. 26, 1990 [JP] Japan .................... 2-16998

[51] Int. Cl.$^5$ ............... H04N 11/00; H04N 7/04; H04N 11/06
[52] U.S. Cl. .................... 358/141; 358/12
[58] Field of Search .................... 358/12, 141, 140, 11

[56] References Cited

U.S. PATENT DOCUMENTS

| | | | |
|---|---|---|---|
| 4,660,072 | 4/1987 | Fukinuki | 358/12 |
| 4,745,458 | 5/1988 | Hirano et al. | 358/11 |
| 5,012,326 | 4/1991 | Sakamoto et al. | 358/11 |
| 5,014,116 | 5/1991 | Kawai | 358/12 |
| 5,019,902 | 5/1991 | Yasuki et al. | 358/133 |

FOREIGN PATENT DOCUMENTS 1-084992 3/1989 Japan .
1-143594 6/1989 Japan .

OTHER PUBLICATIONS

"Extended Definition TV Fully Compatible with Existing Standards", Fukinuki et al., IEEE, vol. Com 32, No. 8, Aug. 1984, pp. 948-952.

"A Wide Screen EDTV", Kawai et al., IEEE, vol. 35, No. 3, Aug. 1989, pp. 133-141.

Primary Examiner—James J. Groody
Assistant Examiner—Safet Metjahic
Attorney, Agent, or Firm—Ostrolenk, Faber, Gerb & Soffen

[57] ABSTRACT

Transmitting and receiving apparatus, for transmitting an input video signal having 525 lines/field progressive scanning by converting the input video signal into a signal compatible with the NTSC system, and for reproducing from that NTSC-compatible signal a video signal having 525 lines/field progressive scanning. The transmitting apparatus has a first separating system for separating vertical high frequency components in a three-dimensional horizontal-vertical-temporal domain from the input video signal; a modulating system for modulating the separated components from the first separating system by $\mu$-modulation; a system for filtering a modulation output from the modulating system to remove a lower sideband component from the modulation output, the filtering system having a Nyquist characteristic; and a system for multiplexing a filtered output from the filtering system to form the NTSC-compatible signal. The receiving apparatus has a second separating system for separating the multiplexed filtered output from the NTSC-compatible signal; and a system for reproducing a video signal having 525 lines/field progressive scanning in response to the filtered output from the second separating system. More particularly, the vertical high-frequency components have a vertical spatial frequency of 515/4 cph, and the filtered output from the filtering system has a frequency band of 2.2 MHz to 4.2 MHz.

2 Claims, 11 Drawing Sheets

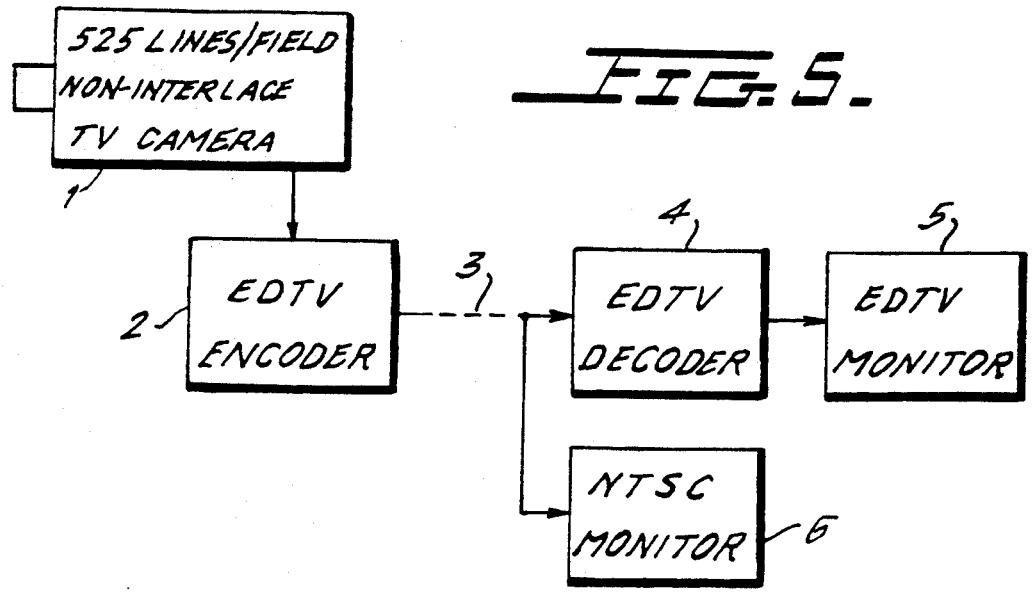
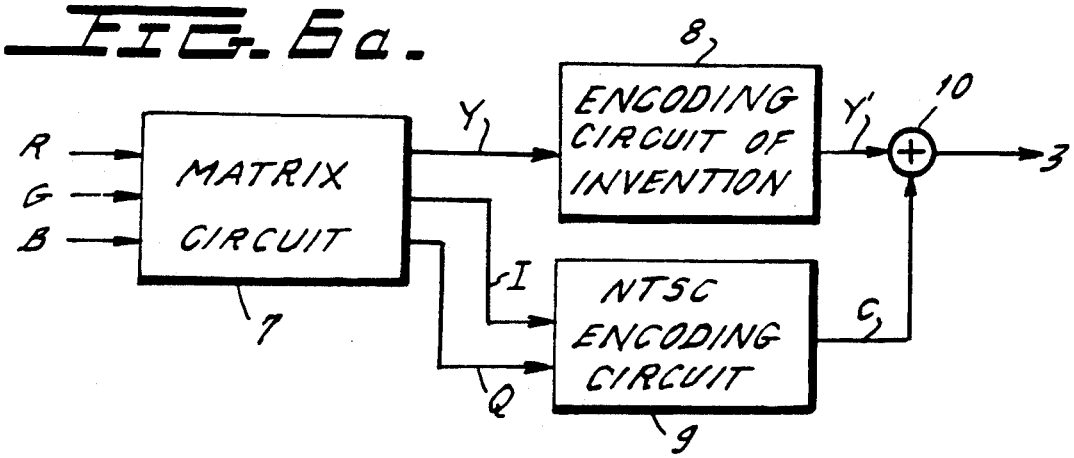
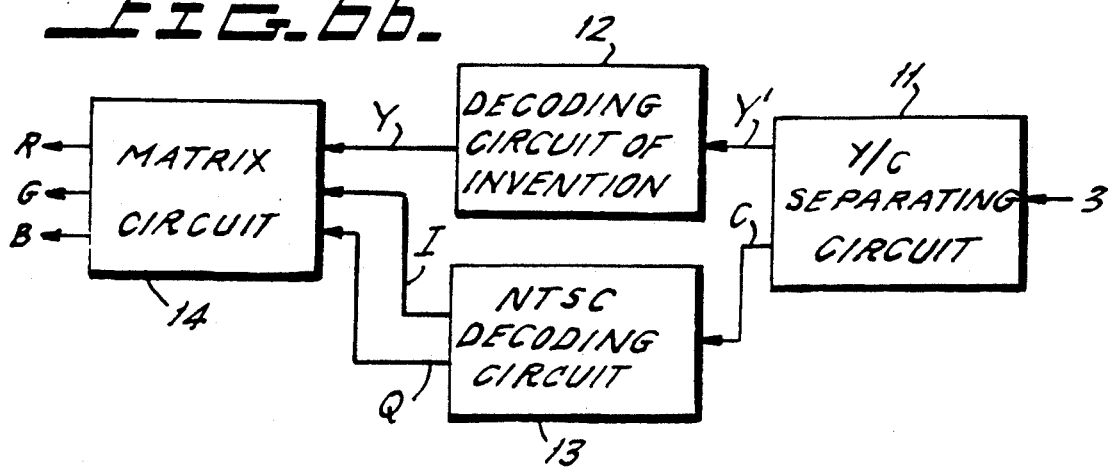

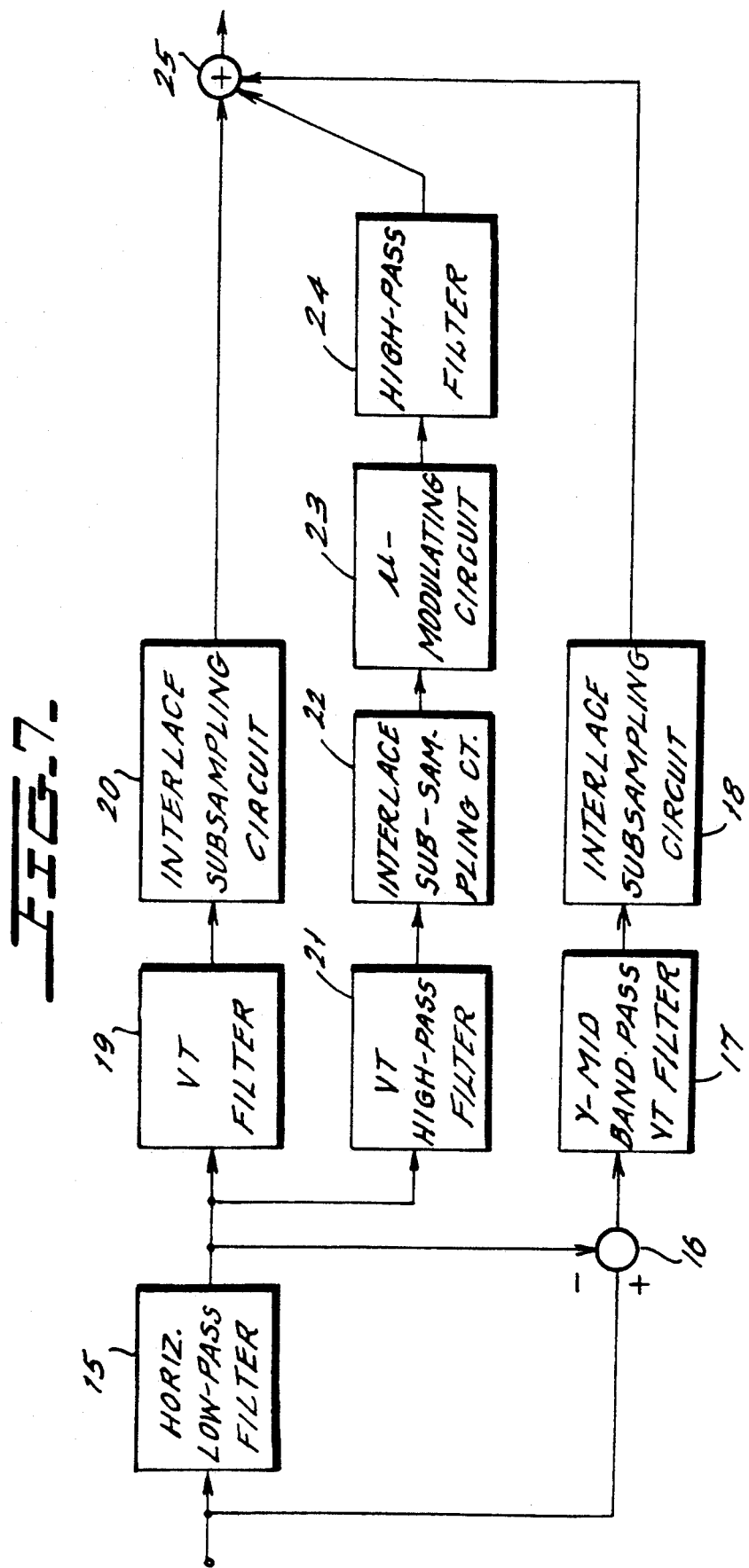

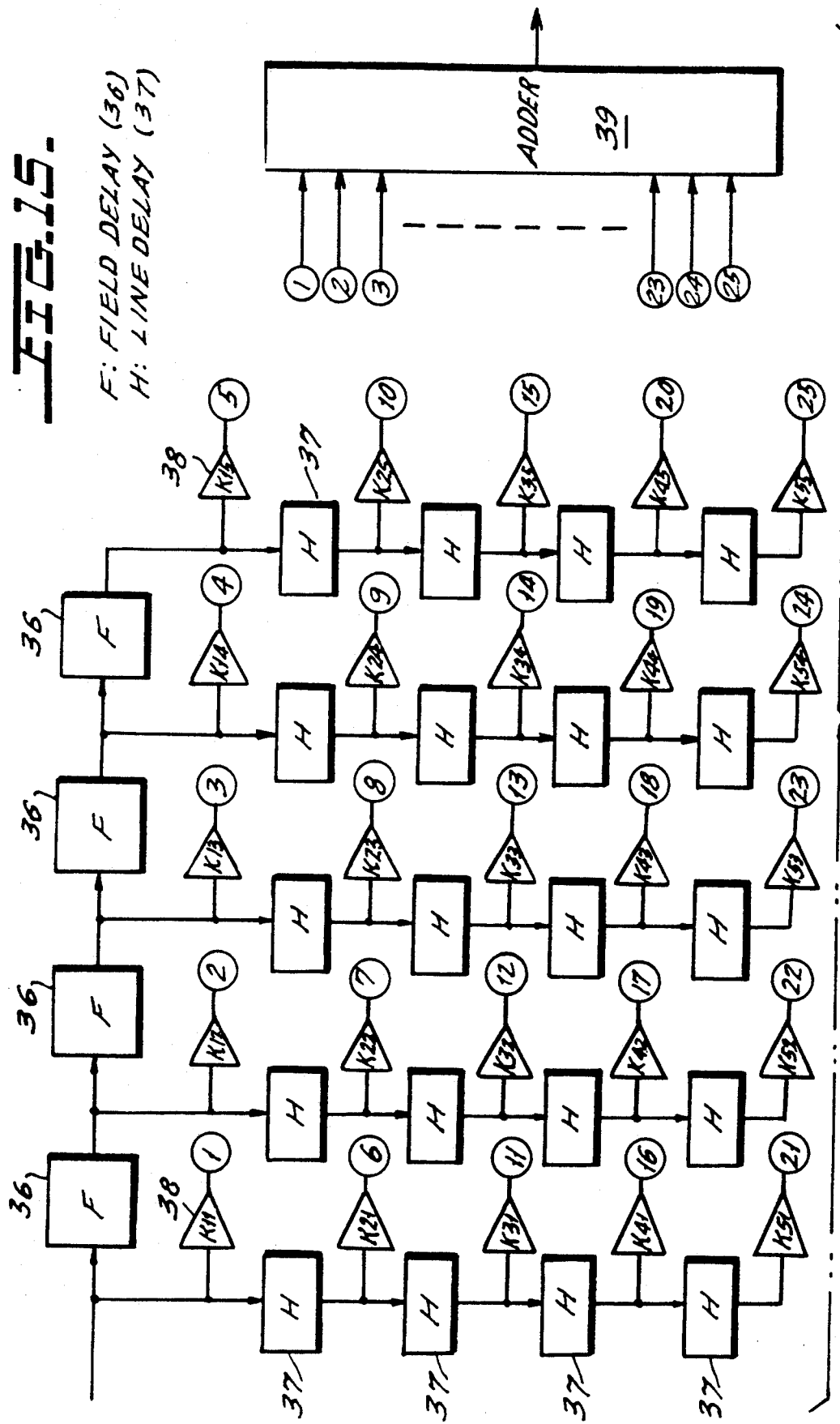

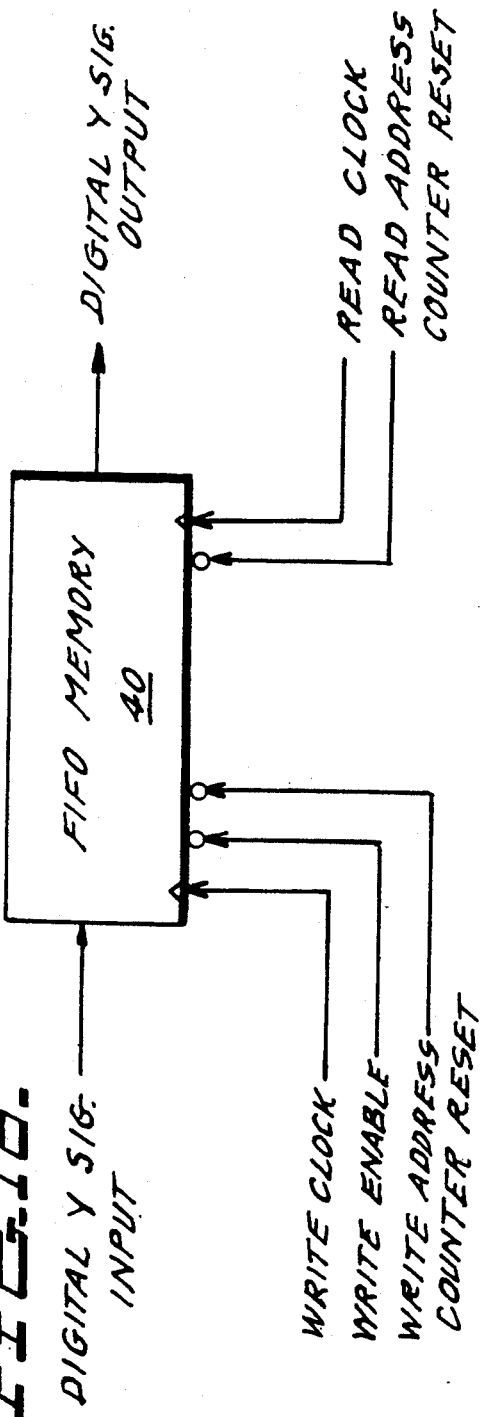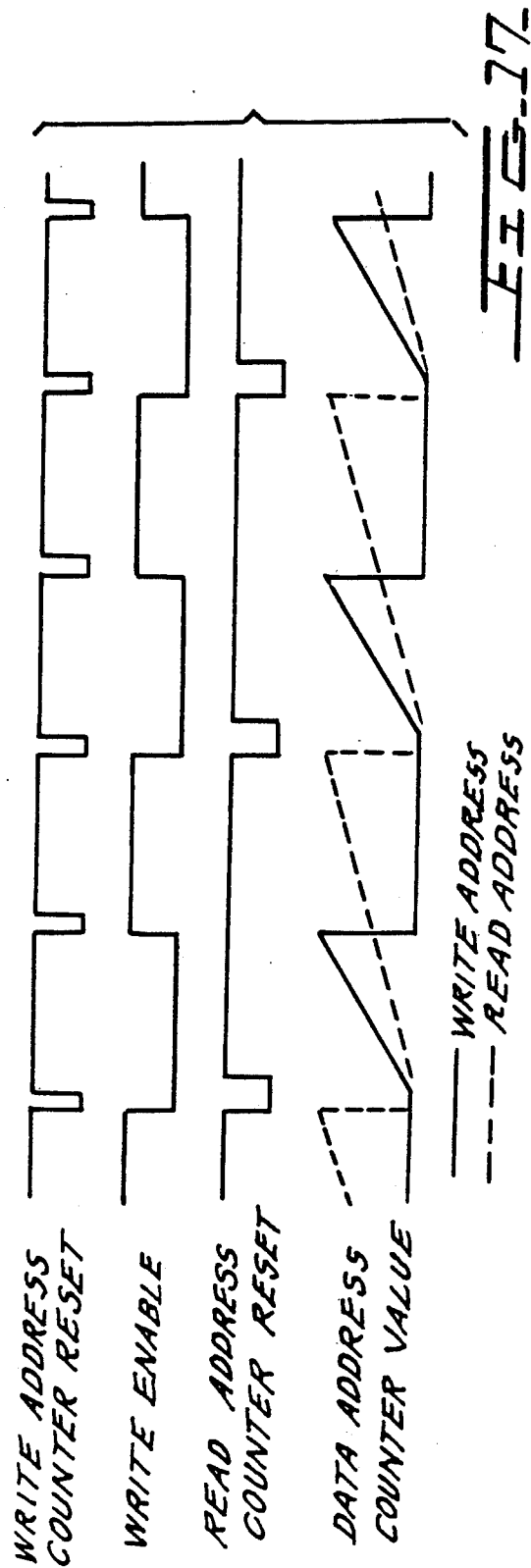

APPARATUS FOR TRANSMITTING AN EXTENDED DEFINITION TV SIGNAL HAVING COMPATIBILITY WITH A CONVENTIONAL TV SYSTEM

BACKGROUND OF THE INVENTION

1. Field of the Invention

The present invention relates to an extended definition or enhanced definition (ED) TV system and, more particularly, to an apparatus for transmitting an extended definition TV signal having a broader frequency band than conventional TV signals over a conventional TV signal transmission line while being compatible with a conventional TV signal on the same line.

2. Description of Related Art

Systems for transmitting a higher definition TV signal while preserving the compatibility thereof with conventional TV systems (e.g. the NTSC system) have recently been proposed or tested. These ED systems in general are used in order to, for example, multiplex frequency components higher than 4 MHz or to multiplex picture information of both side panels in a high definition signal having an aspect ratio of 16:9.

Generally, when a 525 lines/field progressive scanning (non-interlace) signal is transmitted as an extended definition TV signal by an interlace scanning process which is applied to the NTSC system or to a similar conventional TV system, the signal is, theoretically, in the rhombic range of the vertical-temporal frequency domain. This is indicated by a dotted line in FIG. 1, where the signal in this range can be transmitted without causing aliasing distortions, as generally accepted. It will be seen that the progressive scanning signal has a particular frequency band indicated by a solid line in FIG. 1, showing the range beyond where the vertical-temporal frequencies are too high and cannot be transmitted. Therefore, it is necessary to enlarge the frequency range by using supplemental components on the reception side. However, vertical high frequency components (indicated by the hatched areas 10 and 12 in FIG. 2 and centered around the vertical frequency of 525/2 cph) have customarily been removed by a low pass filter as components disturbing a conventional TV receiver as described in Yasuki et al. by a paper entitled "A Study of Multiplexing Technique for Greater Aspect Ratio", the Institute of Television Engineer's of Japan, Technical Report BCS89-4, pp. 19-24 (August 1989). Specifically, as shown in FIG. 3, it has been customary to remove components around 525/2 cph by motion-adaptive LPF processing. This processing is directed toward the reduction of interline flicker in still pictures and the reduction of vertical aliasing interference in motion pictures, each of which is found in the conventional TV receiver. This stems from the fact that while a signal having an extended vertical high frequency spectrum is desirable with a receiver using an up-converter (interlace scan to progressive scan conversion) from the sharpness standpoint, consideration has to be given to the reduction of interference in the conventional TV receiver which uses interlace scanning. For this reason, even the range indicated by the dotted line in FIG. 1 has heretofore not been transmitted in practice.

A system for multiplexing and transmitting supplemental components to enhance vertical resolution is taught by Ito et al. in a paper entitled "Study and Experiments of NTSC Compatible Wide Aspect Broadcasting System", the Institute of Television Engineers of Japan, Technical Report BCS 89-10, pp. 55-60 (September 1989). The system disclosed in this paper removes vertical high frequency components to display a picture having a wide aspect ratio of 16:9 on a conventional NTSC receiver, but this removal causes a lower vertical resolution. The removed vertical high frequency components are to transmitted the reception side as multiplexed supplemental components, and the original resolution is recovered by using the multiplexed components on the reception side. Although such a system basically differs from the "transmission of components which cannot be transmitted by the NTSC system" to which the present invention pertains, it is common to the present invention regarding the separation and transmission of vertical high frequency components and will therefore be outlined. The system as taught in the referenced article detects whether a picture is still or moving and, when the picture is still, transmits high frequency components from 360/2 cph to 480/2 cph in upper and lower mask portions as shown by area 14 in FIG. 4. With this system, adaptive processing based on such still motion detection is essential. Further, since signal processing on a main panel portion corresponding to an NTSC signal executes vertical time-compression after vertical low pass filter (V LPF) processing, the vertical frequency components below 360/2 cph are spread to an upper frequency of 480/2 cph. As a results, a picture appearing on the NTSC receiver suffers from noticeable interline flicker when it is still.

As stated above, it has been customary to remove vertical high frequency components above 360/2 cph as interference components on the transmitting side beforehand and to thereby lower vertical resolution on the a reception side. While an implementation for separating and transmitting vertical high frequency components has been proposed, it aggravates interline flicker on an NTSC receiver. Moreover, this prior art implementation needs complicated processing and large scale hardware due to the motion-adaptive processing, while suffering from the degradation of picture quality due to adaptive processing.

SUMMARY OF THE INVENTION

It is therefore an object of the present invention to provide an extended definition TV signal transmission apparatus capable of transmitting vertical high frequency components, which the NTSC system has heretofore removed at a transmit station to avoid interline flicker at a receive station, without disturbing a conventional NTSC receiver at a receiver station.

In accordance with the present invention, there is provided an extended definition TV signal transmission apparatus having an encoder incorporated in a transmit station for handling a luminance signal, the encoder comprising means for separating a 525 lines/field progressive scanning extended definition TV signal into a horizontal low frequency range (Y-low) and a horizontal medium frequency range (Y-mid), a vertical temporal (VT) filter for separating the vertical high frequency range (Vhi) and the horizontal low frequency range, a prefilter for receiving the horizontal low frequency component for avoiding aliasing in the event of conversion from progressive scanning to interlace scanning, a VT bandpass filter for insuring an area to multiplex the separated vertical high frequency range and the horizontal medium frequency range, means for multiplexing the separated vertical high frequency range into the horizontal medium frequency range, means for converting the output of each filter to have interlace scanning, and an adder for adding the converted signals to output a composite NTSC luminance signal.

Also, in accordance with the present invention, there is provided a decoder incorporated in a receiver station, comprising means for separating a video signal into a horizontal low frequency range and a horizontal medium frequency range, a VT filter for separating vertical high frequency components multiplexed into the horizontal medium frequency range, means for restoring the multiplexed vertical high frequency range to the original signal, means for converting horizontal low frequency components, horizontal medium frequency components and vertical high frequency components to have progressive scanning, and an adder for adding progressive scanning-converted components to reproduce a progressive scanning signal generated by an encoder.

BRIEF DESCRIPTION OF THE DRAWINGS

The above and other objects, features and advantages of the present invention will become more apparent from the following detailed description taken with the accompanying drawings in which:

FIG. 5 is a block diagram showing a TV signal transmission system using the present invention;

FIGS. 6(a) and 6(b) are block diagrams schematically showing respectively the EDTV encoder 2 and the EDTV decoder 4 shown in FIG. 5;

FIG. 7 is a block diagram showing details of the encoding circuit 8 in FIG. 6(a) embodying the present invention;

FIG. 15 is a block diagram schematically showing the construction of a VT filter shown in FIG. 2;

FIG. 16 is a schematic block diagram showing details of an interlace subsampling circuit shown in FIG. 7;

FIG. 17 is a timing chart demonstrating the operation of the interlace subsampling circuit shown in FIG. 16;

DESCRIPTION OF THE PREFERRED EMBODIMENT

Figure 1:
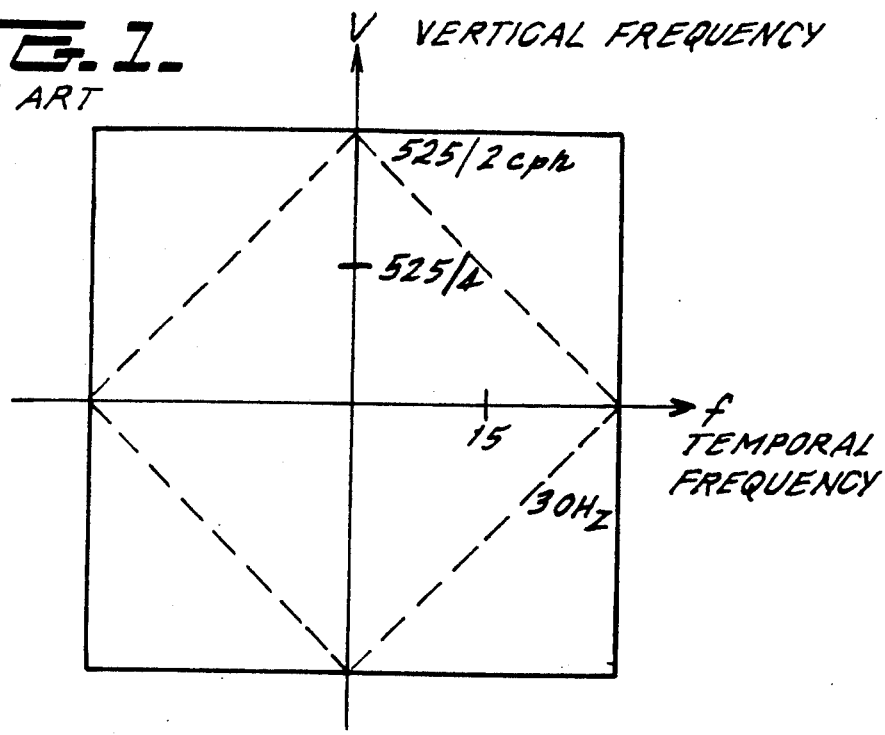
FIG. 1 is a plot in the vertical-temporal frequency domain can be transmitted without aliasing by interlace scanning.

Referring to FIG. 5 of the drawings, a TV signal transmission system using a transmitting method of the present invention is shown. Using an existing transmission channel for the conventional NTSC system, the system shown in the figure is capable of transmitting a 525 lines/field non-interlace TV signal whose frequency band is twice broader than, the frequency band of an NTSC TV signal (twice the amount of information), and displaying it on a monitor adapted for an extended definition TV signal or even on a NTSC TV monitor without interline flicker.

In FIG. 5, a TV camera 1 generates a 525 lines/field non-interlace (line progressive) TV signal while feeding it to an extended definition (ED) TV encoder 2 in accordance with the present invention. The EDTV encoder 2 transforms the input TV signal to a signal compatible with the NTSC system and, yet, having multiplexed high frequency components. The resulting signal is sent to a receiver station over a transmission line or channel 3 adapted for the NTSC system. The receiver station has an EDTV decoder 4 also in accordance with the present invention for decoding the incoming EDTV signal. An EDTV monitor 5 displays the decoded EDTV signal thereon with extended definition. The signal propagated through the transmission line 3 is also fed to a conventional NTSC monitor 6 to be displayed thereon on the NTSC system basis.

FIGS. 6(a) and 6(b) show specific constructions of the EDTV encoder 2 and the EDTV decoder 4. As shown, the encoder 2 has a matrix circuit 7 which receives red (R), green (G) and blue (B) component signals to produce a luminance signal Y and chrominance signals I and Q. An encoding circuit 8 to which the Y signal is applied produces an interlace signal Y' having multiplexed vertical high frequency components. Receiving the I and Q signals from the matrix circuit 7, a conventional encoding circuit 9 undergoes interlace scan conversion and outputs a color signal C further modulated orthogonally by a subcarrier. A multiplexer 10 multiplexes the Y signal and the color signal C from the encoding circuits 8 and 9, respectively.

The EDTV decoder 4 shown in FIG. 6(b) has a Y/C separating circuit 11 for separating the signal coming in over the transmission line 3 into the luminance signal Y' and the color signal C. A decoding circuit 12 decodes the interlace signal Y' to produce the non-interlace luminance signal Y having multiplexed vertical high frequency components. A decoding circuit 13 decodes the color signal C to reproduce the chrominance signals I and Q. A matrix circuit 14 generates high definition R, G and B signals in response to the signals Y, I and Q.

The encoding circuit 8 and decoding circuit 12 shown in FIGS. 6(a) and 6(b) will now be described in detail.

Figure 8:
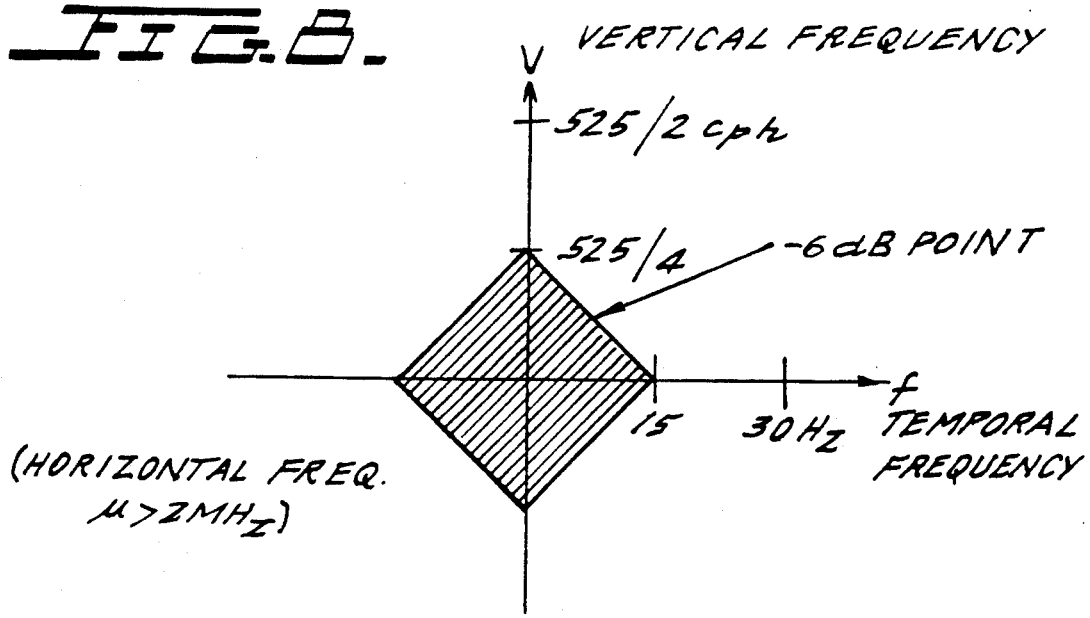
FIG. 8 is a plot in the vertical-temporal frequency domain showing of an area limited in frequency band by the VT filter 17 shown in FIG. 7.

FIG. 7 shows the encoding circuit 8 shown in FIG. 6(a) and embodying the present invention. A 525 lines/field progressive scanning digital video signal (luminance signal) is applied to the input. A horizontal low pass filter (H-LPF) 15 outputs frequency components of the video signal having frequencies lower than 2 MHz. A subtractor 16 subtracts such frequency components from the video signal. Hence, the output of the subtractor 16 is higher than 2 MHz. A Y-mid band pass VT filter 17 limits the frequency band of the components higher than 2 MHz in the vertical and temporal frequency domain, as shown in FIG. 8 by way of example. The VT filter 17 serves two different functions at the same time, i.e., a function of preventing the aliasing of interlace subsampling and a function of eliminating crosstalk by preventing the luminance signal from extending into the range of multiplexed components including the color signal. An interlace subsampling circuit 18 subsamples the output of the VT filter 17, as shown in FIG. 9, in order to convert progressive scanning to interlace scanning.

Figure 2:
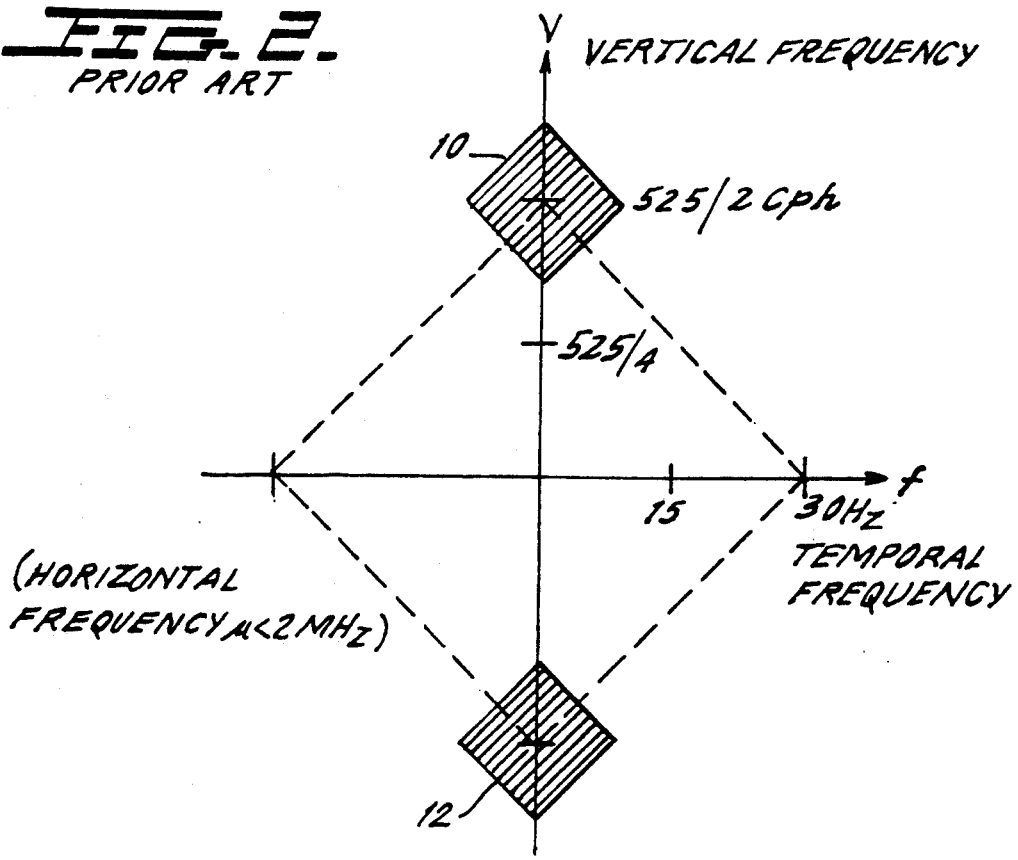
FIG. 2 is a plot in the vertical-temporal frequency domain showing frequency ranges which are causative of interline flicker in the NTSC system.
Figure 3:
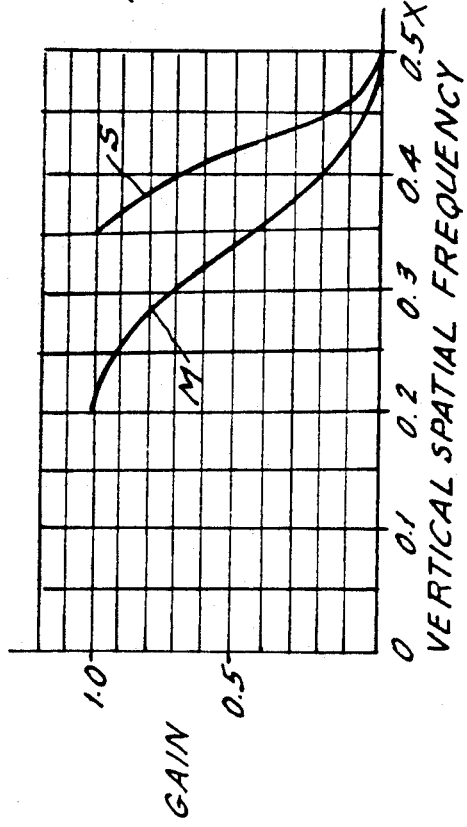
FIG. 3 is a graph showing the characteristics of a motion-adaptive vertical low pass filter as used in a prior art system.
Figure 4:
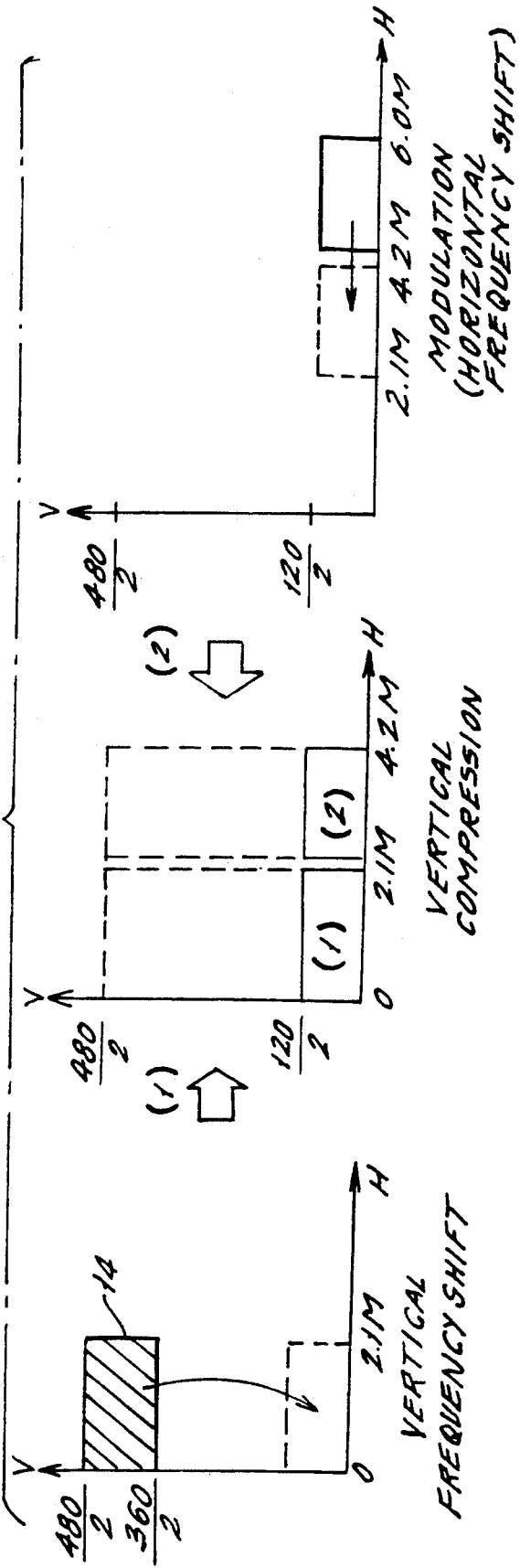
FIG. 4 presents three x-y plots demonstrating a conventional implementation for multiplexing vertical high frequency components.
Figure 9:
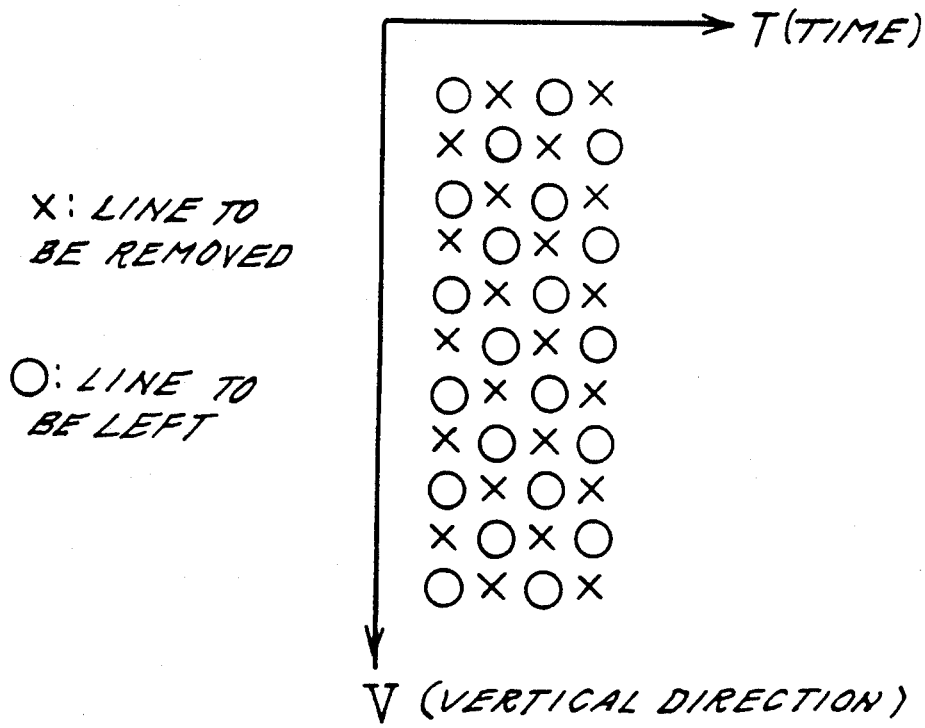
FIG. 9 is an illustration useful for understanding the operation of an interlace subsample circuit shown in FIG. 7.
Figure 10A:
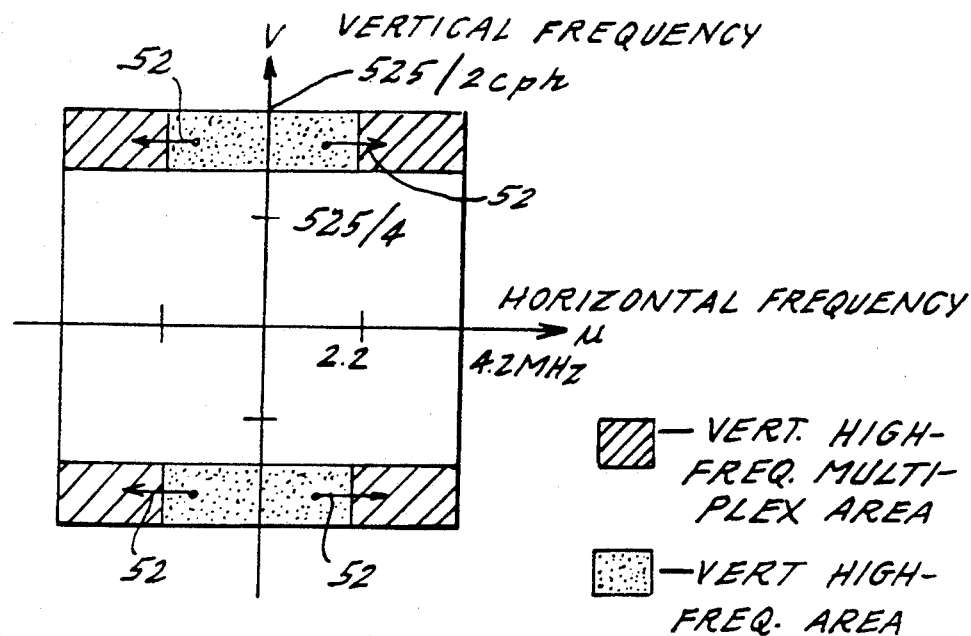
FIGS. 10(a) and 10(b) are x-y plots in two frequency domains demonstrating the multiplex of vertical high frequency components as implemented in the present invention.

The components lower than 2 MHz are limited in band by a VT filter 19 and then subsampled by an interlace subsampling circuit 20, also as shown in FIG. 9, whereby the conversion from progressive scanning to interlace scanning is implemented. The VT filter 19 serves to prevent the aliasing of interlace subsampling and to remove the frequency range which will be conspicuous as interline flicker on an NTSC monitor (FIG. 2). A VT high pass filter (HPF) 21 separates the range to be removed by the VT filter 19 as vertical high frequency components which should be transmitted. These separated components are converted into interlace scanning by an interlace subscampling circuit 22. While multiplexing such vertical high frequency components with an NTSC signal may be implemented by any of the conventional methods such as the one using FUKINUKI HOLE, the illustrative embodiment will concentrate on a method which multiplexes them in an oblique high frequency range shown in FIGS. 10(a) and 10(b). The output of the interlace subsampling circuit 22 is modulated by a horizontal frequency of 2.203 MHz in a μ-modulating circuit 23. As a result, as shown in FIG. 11, a lower sideband component and an upper sideband component are generated at opposite sides of the carrier frequency. A high pass filter (HPF) 24 having the Nyquist characteristic picks up only the upper sideband component. Consequently, the vertical high frequency components are shifted by 2.2 MHz, as indicated by an arrows 52 in FIG. 10(a). An adder 25 adds the output of the HPF 24 and the output of the interlace subsampling circuit 18 to the output of the interlace subsampling circuit 20, thereby generating a signal corresponding to the luminance signal of an NTSC signal.

Thereafter, the resulted signal is subjected to NTSC encoding which multiplexes a color signal by a subcarrier, whereby it achieves compatibility with an ordinary NTSC signal.

Figure 12:
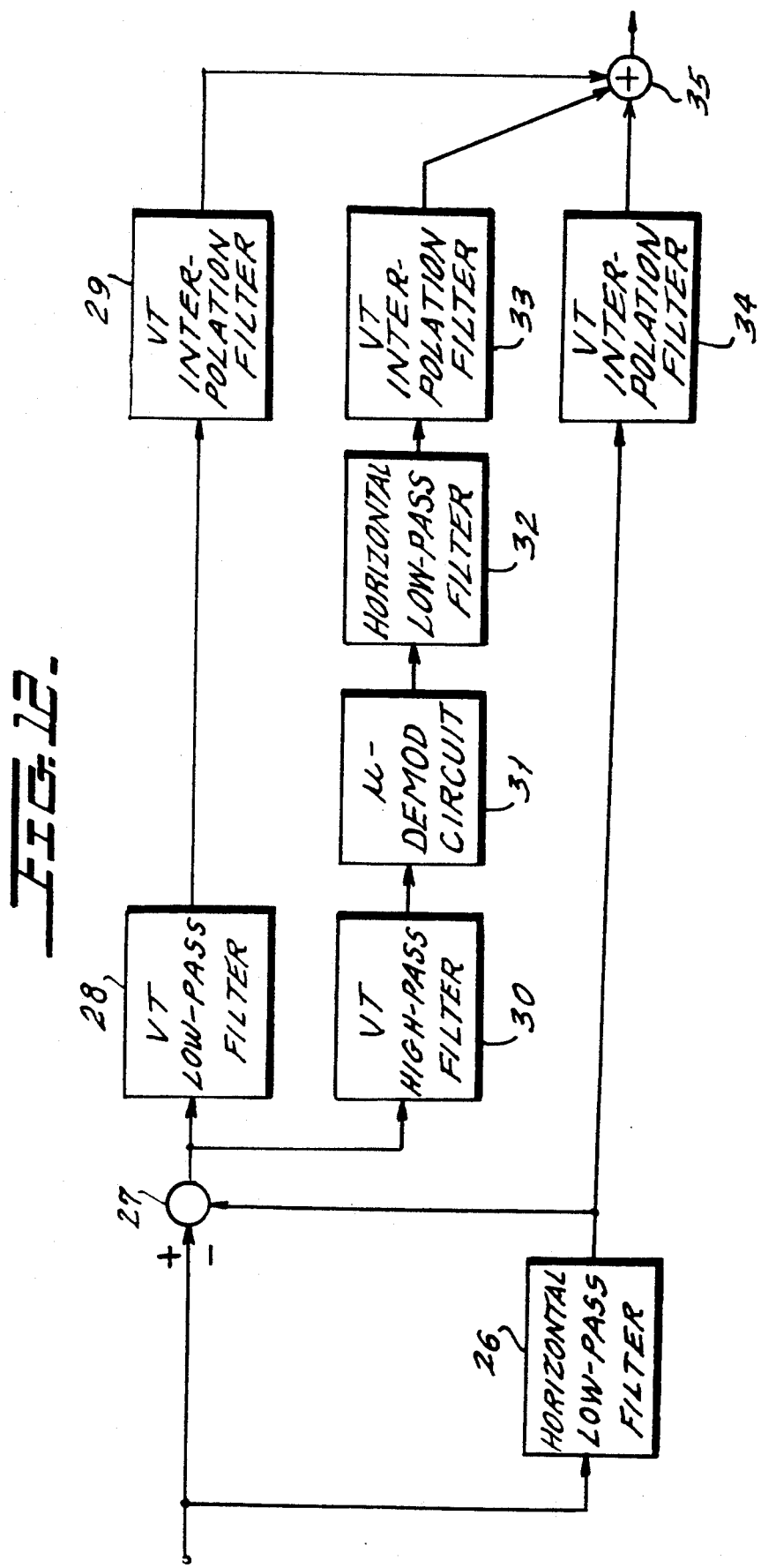
FIG. 12 is an enlarged block diagram showing details of the decoding circuit embodied in the present invention.
Figure 13:
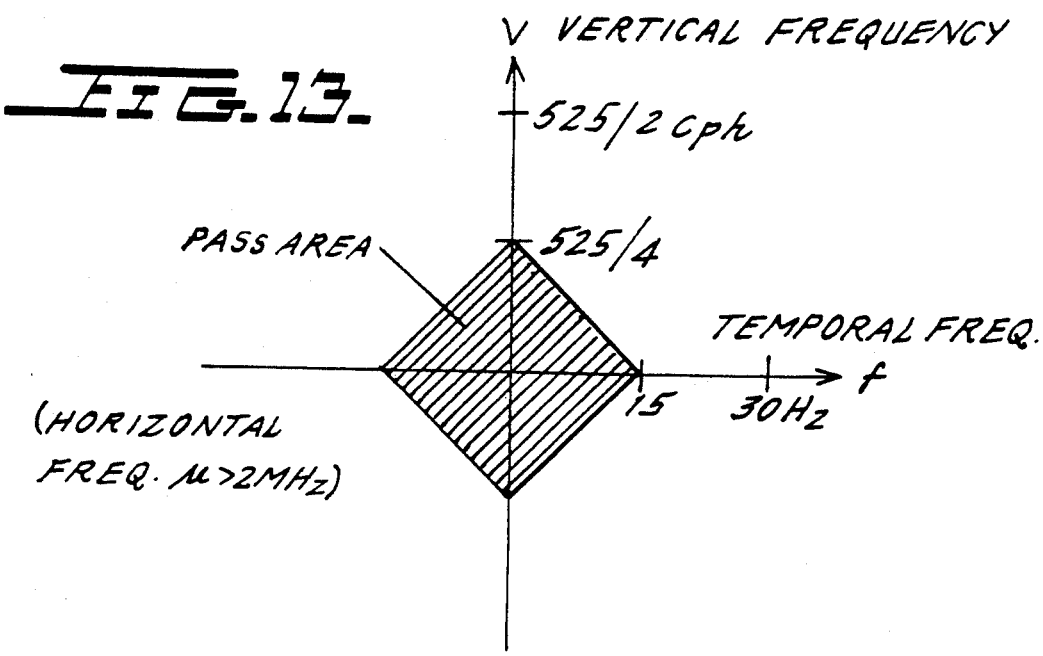
FIG. 13 is a plot in the vertical-temporal frequency domain showing the characteristic of a VT low pass filter 28 shown in FIG. 12.

FIG. 12 shows a decoding circuit also embodying the present invention. In the figure, the decoding circuit receives the NTSC signal from which the color signal has been separated, i.e. it receives only the digitized luminance signal. A horizontal low pass filter (H-LPF) 26 outputs components of the video signal which are lower than 2 MHz, while a subtractor 27 subtracts them from the video signal. As a result, the output of the subtractor 27 is higher than 2 MHz. The output of the subtractor 27 is filtered by a VT low pass filter (LPF) 28 in the vertical-temporal frequency domain, as shown in FIG. 13, and is thereby separated as a luminance component. The separated component is applied to a VT interpolation filter 29 to reconstruct the scanning lines which have been subsampled by the interlace subsampling, whereby the interlace scanning is transformed into progressive scanning.

Figure 10B:
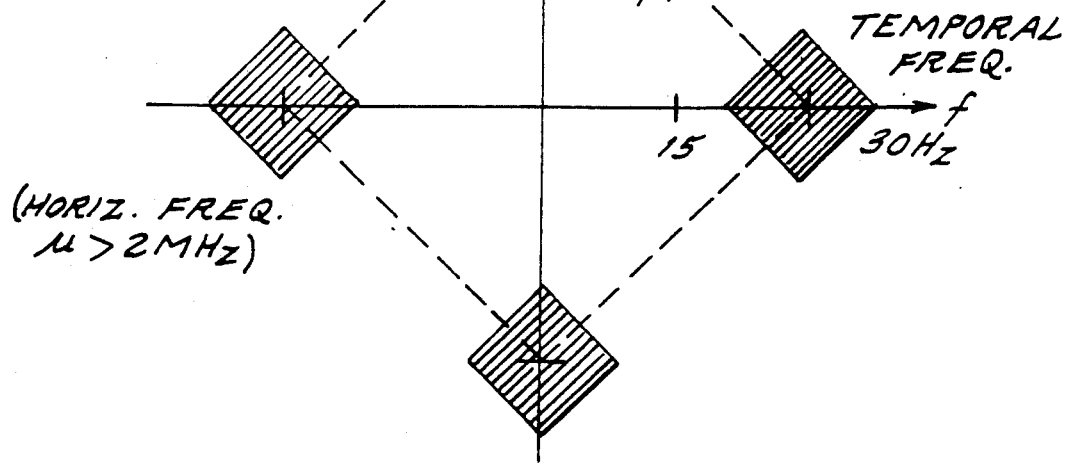
Figure 11:
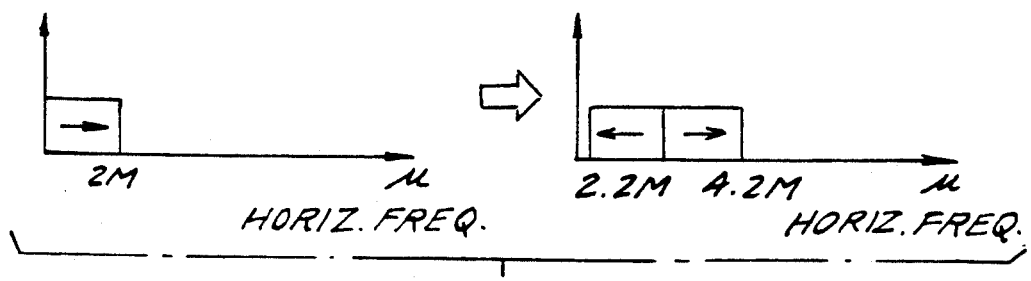
FIG. 11 are amplitude frequency plots indicative of the operation of $\mu$-modulator circuit 23 shown in FIG. 7.
Figure 14:
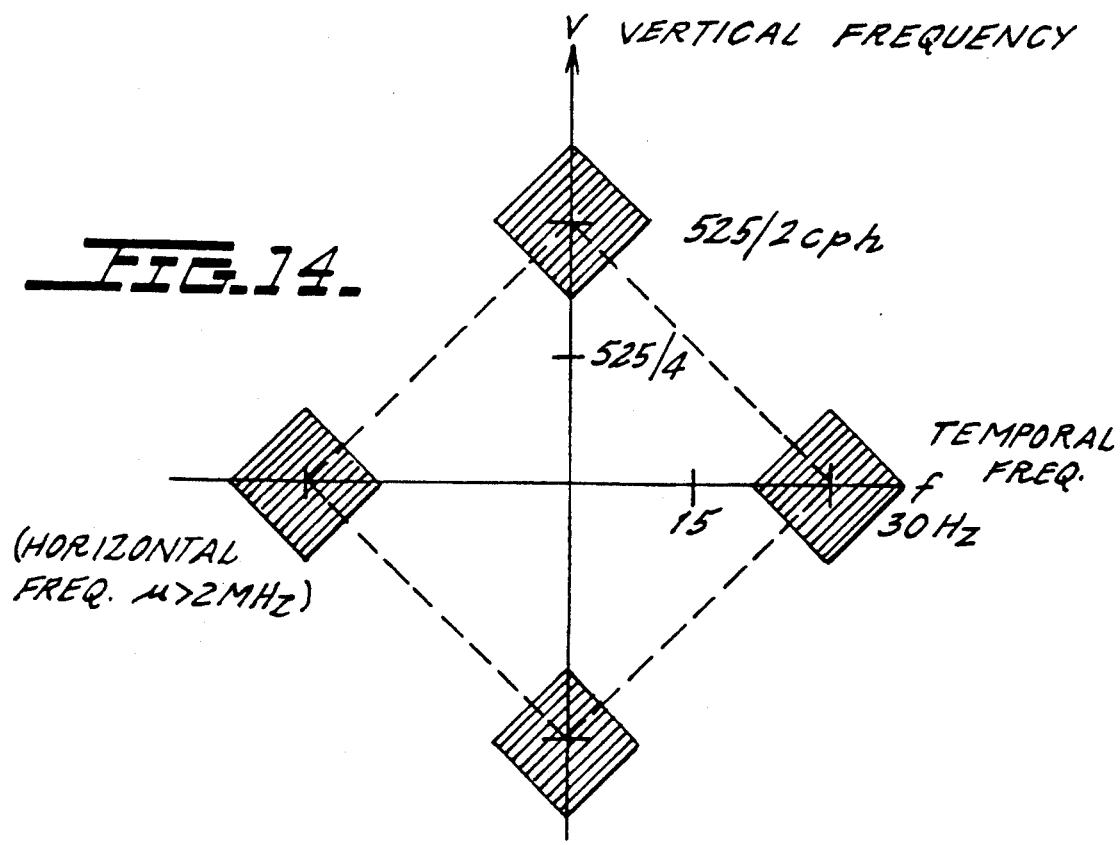
FIG. 14 is a plot in the vertical-temporal frequency domain showing the characteristic of a VT high pass filter 30 also shown in FIG. 12.

Vertical high frequency components are multiplexed with the components higher than 2 MHz in the range shown in FIG. 10(b). These components are removed by a VT high pass filter (HPF) 30 whose characteristic is shown in FIG. 14. The output of the VT HPF 30 is demodulated by 2.2 MHz in a μ-demodulating circuit 31, as done on the encoding side. As a result, a lower sideband and an upper sideband are produced in the frequency ranges of 0-2 MHz and 4.4–6.4 MHz, respectively. A horizontal low pass filter (H-LPF) 32 picks up only the lower sideband from the output of the μ-demodulating circuit 31. A VT interpolation filter 33 transforms the output of the H-LPF 32 to progressive scanning.

On the other hand, the components lower than 2 MHz are transformed into progressive scanning by a VT interpolation filter 34. The outputs of the VT interpolation filters 29, 33 and 34 are added by an adder 35 to reproduce a 525 lines/field progressive scanning signal.

Hereinafter will be described the constructions of the VT filters with which the illustrative embodiment is implemented. To begin with, the VT filters 17 and 19 included in the encoding circuit (FIG. 7) each comprises a two dimensional non-recursive filter, as shown in FIG. 15. While the non-recursive filter is shown as having $5 \times 5$ taps, the component elements of the filter may be increased to increase the number of taps, if necessary. The dimensions of this filter extend in the vertical direction of a picture and in the direction of time. Hence, use is made of field delay elements 36 and 1-line delay elements 37 which are combined, as illustrated in FIG. 15. With such configuration, the filter produces an output having been delayed by m fields (m=0 to 4) and n lines (n=0 to 4) relative to an input phase. The delay by fields should be understood to mean the delay corresponding to 525 lines/field noninterlace scanning lines, and it is the same as the field delay (about 16.7 ms) of the NTSC system. The delay by one line is also equal to one non-interlace scanning time (about 31.78 μs) and one half of one line delay of the NTSC system. The delay elements 36 and 37 are implemented by FIFO (First-In First-Out) memories.

The digital data applied to the VT filter is fed to the first delay elements. The outputs of the field delay elements and the 1-line delay elements are each coupled to the following delay element. As a result, the delay element arrays produce twenty-five outputs at the same time which have been delayed by m fields and n lines relative to the input phase. These outputs are each applied to a respective one of twenty-five multipliers 38 to be multiplied by a coefficient $K_{ij}$ (i=1 to 5, j=1 to 5), which are set according to the filter characteristic. The results of multiplication are added by an adder 39, and the resulting sum is fed out as an output of the VT filter.

FIG. 16 shows a specific construction of any one of the interlace subsampling circuits 18, 20 and 22, while FIG. 17 demonstrates the operation thereof. The interlace subsampling circuit has a FIFO memory 40 and thins prefiltered 525 lines/field non-interlace signals every two lines to produce an interlace signal. A write clock applied to the memory 40 has a frequency twice as high as the frequency of a read clock. Specifically, the write clock has a frequency eight times higher than the frequency of a subcarrier (color subcarrier), while the read clock has a frequency four times higher than the subcarrier frequency. It follows that the rate at which one line of data is written in is twice higher than the rate at which it is read out. As FIG. 17 indicates in terms of the operation of an address counter, one line of data is read while two lines of data are written. To transform two lines of data to one line of data, data has to be subsampled every two lines. For this purpose, a write enable signal is controlled according to the timing shown in FIG. 17. At this instant, the resetting period of a reset signal is twice as long at the read side than at the write side.

Figure 18:
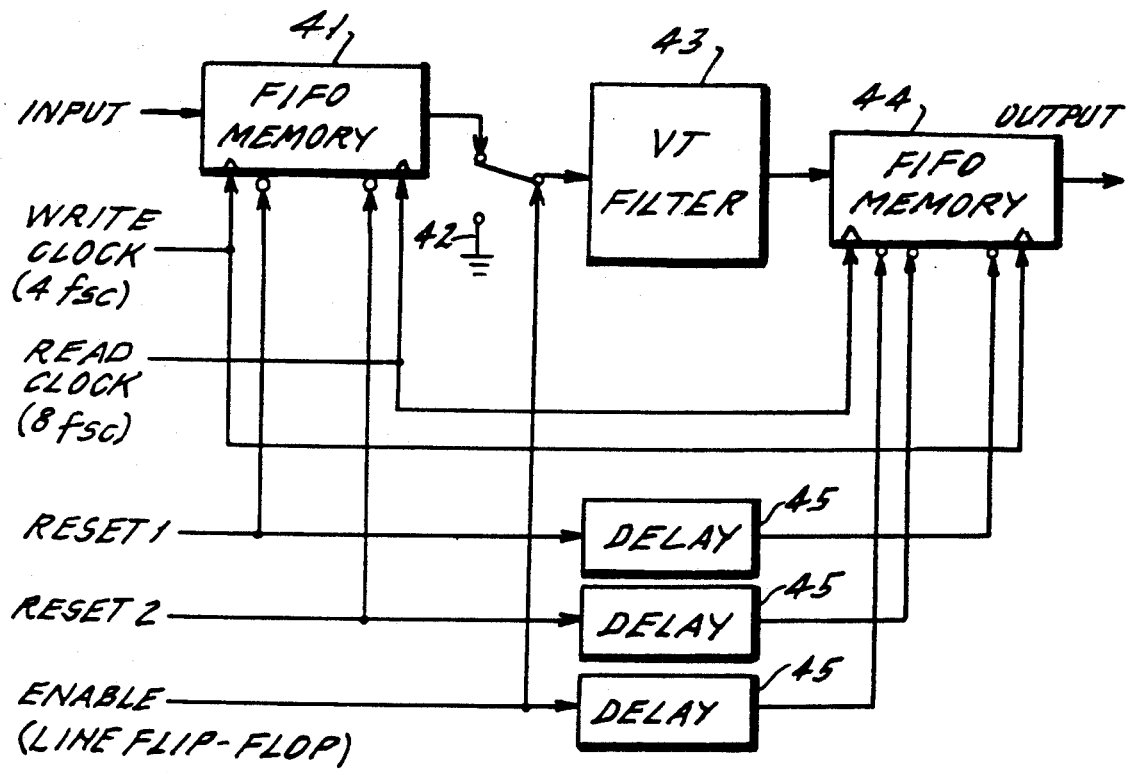
FIG. 18 is a block diagram schematically showing the construction of a VT filter shown in FIG. 12.

FIG. 18 shows a specific construction of any one of the VT filters 28 and 30 included in the decoding circuit of FIG. 12. The VT filter at the decoding side subjects the interlace signal to VT filtering, and for this reason the one-line period differs from that of the encoding side. To share the same filter with the encoding side, the decoding side is provided with a dummy line 42 of data "0" at the input side thereof, as shown in FIG. 18. The input and the dummy line 42 each is selected every two lines to be transformed to the non-interlace signal. The resulting signal is applied to a VT filter 43. At the output of the VT filter, the dummy lines appearing every two lines are thinned by the interlace subsampling circuit 44, FIG. 16. To control the subsampling circuit 44, use may be made of FIFO memory control signals which are applied to the input side. In this case, delay circuits 45 are needed in order to compensate for time delay ascribable to the VT filter 43. Regarding the control signals, the write side and the read side at the input are replaced with each other.

Figure 19:
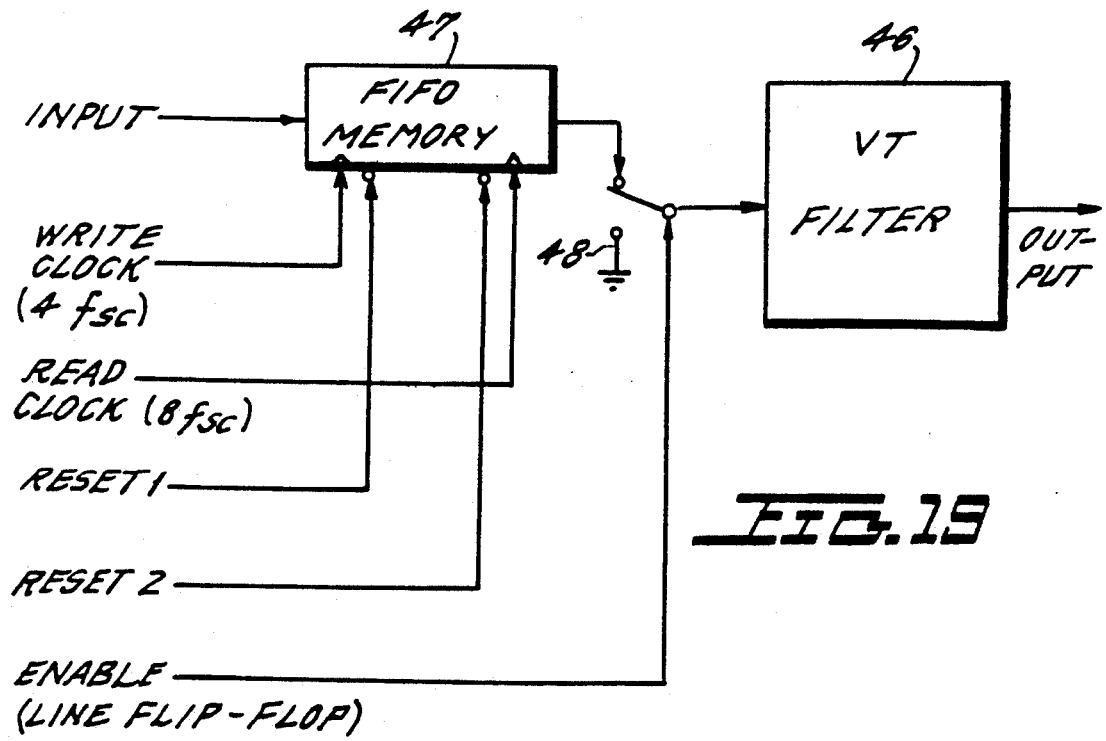
FIG. 19 is a block diagram schematically showing details of a P-I conversion VT interpolation filter shown in FIG. 12.

FIG. 19 shows a specific construction of any one of the I-P conversion VT interpolation filters 29, 33 and 34 of FIG. 12. As shown, a FIFO memory 47 and a dummy line 48 are provided at the input side of a VT filter 46, and each is selected every two lines to be converted into the non-interlace signal. The resulted signal is fed to the VT filter 46. If a filter coefficient is set in the interpolation filter, interpolated data and original data will be obtained on the dummy lines and the originally existing lines, respectively. As a result, the lines are doubled in number and converted into non-interlace signals.

In summary, it will be seen that the present invention not only removes or separates vertical high frequency components causative of interline flicker from a 525 lines/ field non-interlace source signal, but also transmits them so that a receive station may use them to enhance vertical resolution. Another point unique to the present invention is that vertical high frequency components are frequency-division multiplexed in the time and space frequency domain at all times without regard to the movement of a picture, i.e. the frequency components are not multiplexed adaptively to the movement. With these features, the present invention frees an NTSC receiver from interference. Since vertical high frequency components are transmitted to a receive station, the receive station is capable of reproducing up to 525/2 cph components and, therefore, achieves high vertical resolution as to still pictures. Furthermore, since vertical high frequency components are separated by VT filters, some improvement in picture quality is expected even with low speed motion pictures.

What is claimed is:
1. An apparatus for transmitting an input video signal having 525 lines/field progressive scanning from a transmitting side by converting said input video signal into a signal compatible with the NTSC system, and for reproducing from said NTSC-compatible signal a video signal having said 525 lines/field progressive scanning at a reception side;

said transmitting side comprising:
first separating means for separating vertical high frequency components in a three-dimensional horizontal-vertical temporal domain from said input video signal, said vertical high-frequency components having a vertical spatial frequency of 525/4 cph;
means for modulating the separated components from said first separating means by $\mu$-modulation;
means for filtering a modulation output from said modulating means to remove a lower sideband component from said modulation output, said filtering means having a Nyquist characteristic; and
means for multiplexing a filtered output from said filtering means to form said NTSC-compatible signal, said filtered output from said filtering means having a frequency band of 2.2 MHz to 4.2 MHz;
said reception side comprising:
second separating means for separating said multiplexed filtered output from said NTSC-compatible signal; and
means for reproducing a video signal having said 525 lines/field progressive scanning in response to said filtered output from said second separating means.

2. An apparatus for converting an input video signal having 525 lines/field progressive scanning into a signal compatible with the NTSC system, comprising:
first separating means for separating said input video signal into high frequency components higher than 2 MHz and low frequency components lower than 2 MHz;
a first filter for removing from said high frequency components aliasing components ascribable to interlace subsampling and components lying in a frequency range in which a color signal of the NTSC system is multiplexed;
first converting means for converting an output of said first filter into an interlace scanning signal;
a second filter for removing from said low frequency components aliasing components ascribable to interlace subsampling and components which will produce interlace flicker noise on a monitor for the NTSC system;
second converting means for converting an output of said second filter into an interlace scanning signal;
a third filter for extracting said components to be removed by said second filter from said low frequency components separated by said first separating means;
third converting means for converting an output of said third filter into an interlace scanning signals;
multiplex signal producing means for producing a multiplex signal by converting a frequency range of the output of said third filter into a frequency range which will not produce interline flicker noise on a monitor for the NTSC system; and
adding means for adding outputs of said first and second converting means and said multiplex signal producing means to output said compatible signal.

* * * * *